United States Patent
Puiu et al.

(10) Patent No.: US 11,192,436 B1
(45) Date of Patent: Dec. 7, 2021

(54) PARK SYSTEM FOR DUAL MOTOR DRIVE UNIT

(71) Applicant: GM GLOBAL TECHNOLOGY OPERATIONS LLC, Detroit, MI (US)

(72) Inventors: Dumitru Puiu, Sterling Heights, MI (US); Orson S. Wang, Northville, MI (US); Patrick S. Portell, Clarkston, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 17/313,198

(22) Filed: May 6, 2021

(51) Int. Cl.
*B60K 17/16* (2006.01)
*B60K 1/02* (2006.01)
*B60T 1/00* (2006.01)
*F16H 63/34* (2006.01)
*F16H 37/04* (2006.01)
*B60K 17/04* (2006.01)

(52) U.S. Cl.
CPC .............. *B60K 1/02* (2013.01); *B60K 17/046* (2013.01); *B60K 17/165* (2013.01); *B60T 1/005* (2013.01); *F16H 37/041* (2013.01); *F16H 63/3425* (2013.01); *F16H 2702/02* (2013.01)

(58) Field of Classification Search
CPC ...... B60K 1/02; B60K 17/165; B60K 17/046; B60K 2007/0061; B60K 2007/0092; F16H 63/3425; F16H 37/041; F16H 2702/02; B60T 1/005
See application file for complete search history.

(56) References Cited

U.S. PATENT DOCUMENTS

| | | | | |
|---|---|---|---|---|
| 10,876,628 | B2 * | 12/2020 | Gruber | F16H 63/3425 |
| 2013/0303327 | A1 * | 11/2013 | Pichler | B60T 1/005 |
| | | | | 475/224 |
| 2016/0097443 | A1 * | 4/2016 | Larsson | F16H 48/34 |
| | | | | 475/150 |
| 2019/0176618 | A1 * | 6/2019 | Bassis | B60K 1/02 |
| 2020/0108708 | A1 * | 4/2020 | Janson | F16H 3/724 |

FOREIGN PATENT DOCUMENTS

| | | | | | |
|---|---|---|---|---|---|
| CN | 107985068 | A | * | 5/2018 | |
| CN | 207523427 | U | * | 6/2018 | |
| CN | 111114308 | A | * | 5/2020 | |
| DE | 102017107322 | A1 | * | 11/2017 | F16H 48/36 |

* cited by examiner

Primary Examiner — Justin Holmes
(74) Attorney, Agent, or Firm — Quinn IP Law

(57) ABSTRACT

A drive unit includes a first electric machine including a first machine shaft, a second electric machine including a second machine shaft, and a differential interconnecting the first electric machine and the second electric machine. The differential includes a park gear. The drive unit further includes a single park system configured to engage the park gear of the differential to simultaneously stop rotation of both the first electric machine and the second electric machine. The park system includes a single pawl movable between an engaged position and a disengaged position. The pawl is spaced apart from the park gear of the differential in the disengaged position to allow the park gear to rotate. The single pawl is in contact with the park gear of the differential in the engaged position to preclude rotation of the park gear.

18 Claims, 7 Drawing Sheets

PARK SYSTEM FOR DUAL MOTOR DRIVE UNIT

INTRODUCTION

The present disclosure relates to vehicles, and more particularly, to a park system for dual motor drive unit.

SUMMARY

Vehicles may include a park system to stop the rotation of moving components inside a drive unit. However, it is desirable to minimize the size occupied by the drive unit and the park system and to minimize the part count to facilitate manufacturing. Therefore, there is a need to develop a park system that minimizes the space it occupies in the vehicle.

Therefore, the present disclosure describes a vehicle including with a differential that connects two motors. By connecting two motors with a differential, the vehicle employs a one park system to stop the rotation of the two motors. A pawl of the park system is inputted into a park gear of the differential to ground the two motors, thereby stopping the wheels. During normal operation, the two motors are able to perform their respective functions independently.

In an aspect of the present disclosure, a drive unit includes a first electric machine including a first machine shaft, a second electric machine including a second machine shaft, and a differential interconnecting the first electric machine and the second electric machine. The differential includes a park gear. The drive unit includes a park system configured to engage the park gear of the differential to simultaneously stop rotation of both the first electric machine and the second electric machine. The park system may be a single park system. The park system includes a pawl movable relative to the park gear between an engaged position and a disengaged position. The pawl may be a single pawl. The pawl is spaced apart from the park gear of the differential in the disengaged position to allow the park gear to rotate. The pawl is in contact with the park gear of the differential in the engaged position to preclude rotation of the park gear, thereby precluding rotation of the first machine shaft of the first electric machine and the second machine shaft of the second electric machine.

In an aspect of the present disclosure, the first machine shaft of the first electric machine is directly coupled to the differential. The second machine shaft of the second electric machine is directly coupled to the differential. The single pawl is in direct contact with the park gear of the differential when the single pawl is in the engaged position. The differential is open differential.

In an aspect of the present disclosure, each of the first machine shaft and the second machine shaft are rotatable independently from each other. The drive unit further includes a first machine gear coupled around the first machine shaft and a second machine gear coupled around the second machine shaft.

In an aspect of the present disclosure, the drive unit further includes a first transfer shaft coupled to the first machine shaft such that torque is transferred from the first electric machine to the first transfer shaft. The drive unit further includes a second transfer shaft coupled to the second machine shaft such that torque is transferred from the second electric machine to the second transfer shaft. The first transfer shaft and the second transfer shaft are independently rotatable relative to each other. The first transfer shaft and the second transfer shaft are coaxial with each other. The first machine shaft extends along a first machine axis. The second machine shaft extends along a second machine axis. The first machine axis is coaxial with the second machine axis. The first transfer shaft extends along a first transfer axis. The second transfer shaft extends along a second transfer axis, the first transfer axis is coaxial with the second transfer axis, and the first machine axis is parallel to the first transfer axis.

In an aspect of the present disclosure, the drive unit further includes a first shaft gear coupled around the first shaft gear. The first shaft gear is meshed with the first machine gear such that torque is transferred from the first electric machine to the first transfer shaft. The drive unit includes a second shaft gear coupled around the second shaft gear. The second shaft gear is meshed with the second machine gear such that torque is transferred from the second electric machine and the second shaft gear.

In an aspect of the present disclosure, the first transfer shaft includes a first inner gear. The second transfer shaft includes a second inner gear. The drive unit further includes a first output shaft and a second output shaft. The first output shaft and the second output shaft are coaxial with each other. The first output shaft includes a first output gear meshed with the first inner gear such that torque is transferred from the first transfer shaft to the first output shaft. The second output shaft includes a second output gear meshed with the second inner gear such that torque is transferred from the second transfer shaft to the second output shaft. The first output shaft and the second output shaft are rotatably independent from each other.

In an aspect of the present disclosure, the differential may be a torque biasing differential.

In an aspect of the present disclosure, the drive unit further includes at least one planetary gearset coupled to at least one of the first electric machine or the second electric machine.

In an aspect of the present disclosure, the first machine shaft and the second machine shaft are not coaxial. The drive unit further includes a chain connecting the first machine shaft and the second machine shaft through the differential.

In an aspect of the present disclosure, the drive unit further includes a first transfer gear and a second transfer gear. The first transfer gear connects the differential to the first electric machine. The second transfer gear connects the differential to the second electric machine. The first machine shaft and the second machine shaft are not coaxial.

The present disclosure also describes a vehicle system. In an aspect of the present disclosure, the vehicle system includes a vehicle body and a drive unit (as described above) disposed inside the vehicle body.

The above features and advantages, and other features and advantages, of the present teachings are readily apparent from the following detailed description of some of the best modes and other embodiments for carrying out the present teachings, as defined in the appended claims, when taken in connection with the accompanying drawings.

BRIEF DESCRIPTION OF THE DRAWINGS

The present disclosure will be described in conjunction with the following figures, wherein like numerals denote like elements.

DETAILED DESCRIPTION

The following detailed description is merely exemplary in nature and is not intended to limit the application and uses. Furthermore, there is no intention to be bound by expressed or implied theory presented in the preceding technical field, background, brief summary or the following detailed description. As used herein, the term "module" refers to hardware, software, firmware, electronic control component, processing logic, and/or processor device, individually or in a combination thereof, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by a number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with a number of systems, and that the systems described herein are merely exemplary embodiments of the present disclosure.

For the sake of brevity, techniques related to signal processing, data fusion, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that alternative or additional functional relationships or physical connections may be present in an embodiment of the present disclosure.

Figure 1:
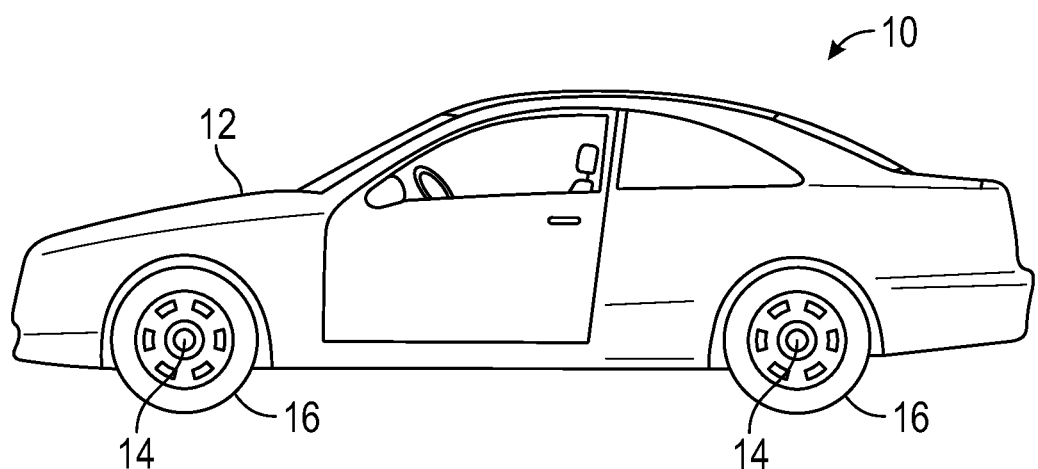
FIG. 1 is a schematic, side view of a vehicle including a drive unit having a park gear.

With reference to FIG. 1, a vehicle 10 includes a vehicle body 12 and a plurality of wheels 14 coupled to the vehicle body 12. Each wheel 14 may be attached to a tire 16. In the depicted embodiment, the vehicle 10 is configured as a sedan. However, it is envisioned that the vehicle 10 may have suitable configurations, such as a pickup truck, an SUV, etc. The vehicle 10 may also be referred to as the vehicle system and includes a drive unit 100.

Figure 2:
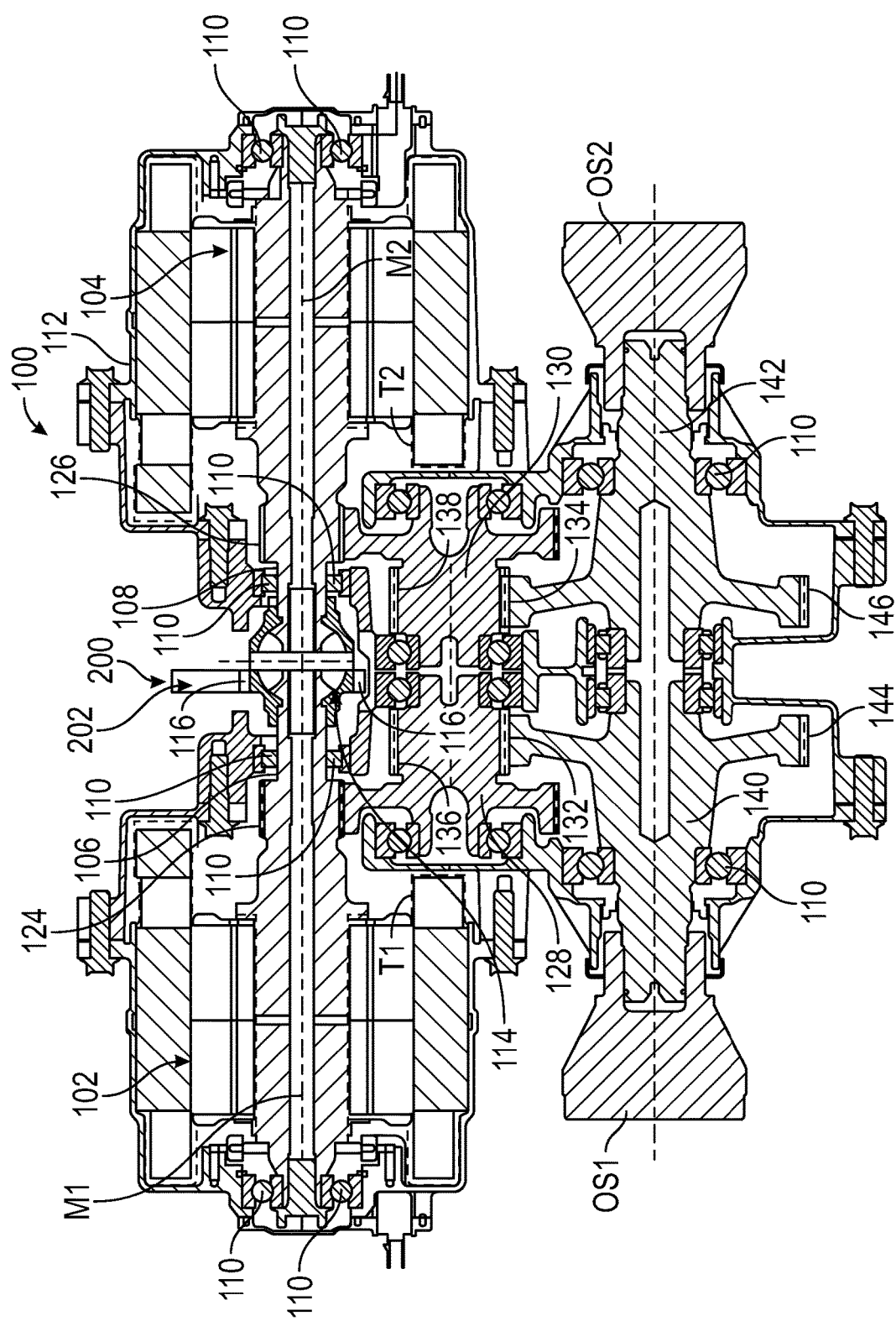
FIG. 2 is a schematic, sectional side view of the drive unit of FIG. 1.

With reference to FIG. 2, the drive unit 100 includes a first electric machine 102 and a second electric machine 104. Each of the first electric machine 102 and the second electric machine 104 may function as an electric motor and therefore convert electrical energy into mechanical energy. It is envisioned, however, that the first electric machine 102 and the second electric machine 104 may also function as a generator and therefore convert mechanical energy into electrical energy. The first electric machine 102 includes a first machine shaft 106 extending along a first machine axis M1. The second electric machine 104 includes a second machine shaft 108 extending along a second machine axis M2. The first machine axis M1 and the second machine axis M2 may be coaxial to minimize the space occupied by the drive unit 100 and facilitate manufacturing of the drive unit 100. The first electric machine 102 and the second electric machine 104 may be supported by bearings 110, such as ball bearings. The drive unit 100 may further include a housing 112 housing the first electric machine 102 and the second electric machine 104.

The drive unit 100 includes a differential 114 interconnecting the first electric machine 102 and the second electric machine 104. In the depicted embodiment, the differential 114 is an open differential and is directly connected to the first machine shaft 106 and the second machine shaft 108 to enhance the structural connection between the differential 114 and the first electric machine 102 and the second electric machine 104. The drive unit 100 may include solely one differential 114 interconnecting the first electric machine 102 and the second electric machine 104 to minimize part count and facilitate manufacturing. Therefore, the drive unit 100 may solely include the first electric machine 102 and the second electric machine 104 to minimize part count and facilitate manufacturing. In other words, the drive unit 100 may solely include two electric machines (i.e., the first electric machine 102 and the second electric machine 104) to minimize part count and facilitate manufacturing and, therefore, the drive unit 100 may be referred to as the dual motor drive unit.

Figure 3:
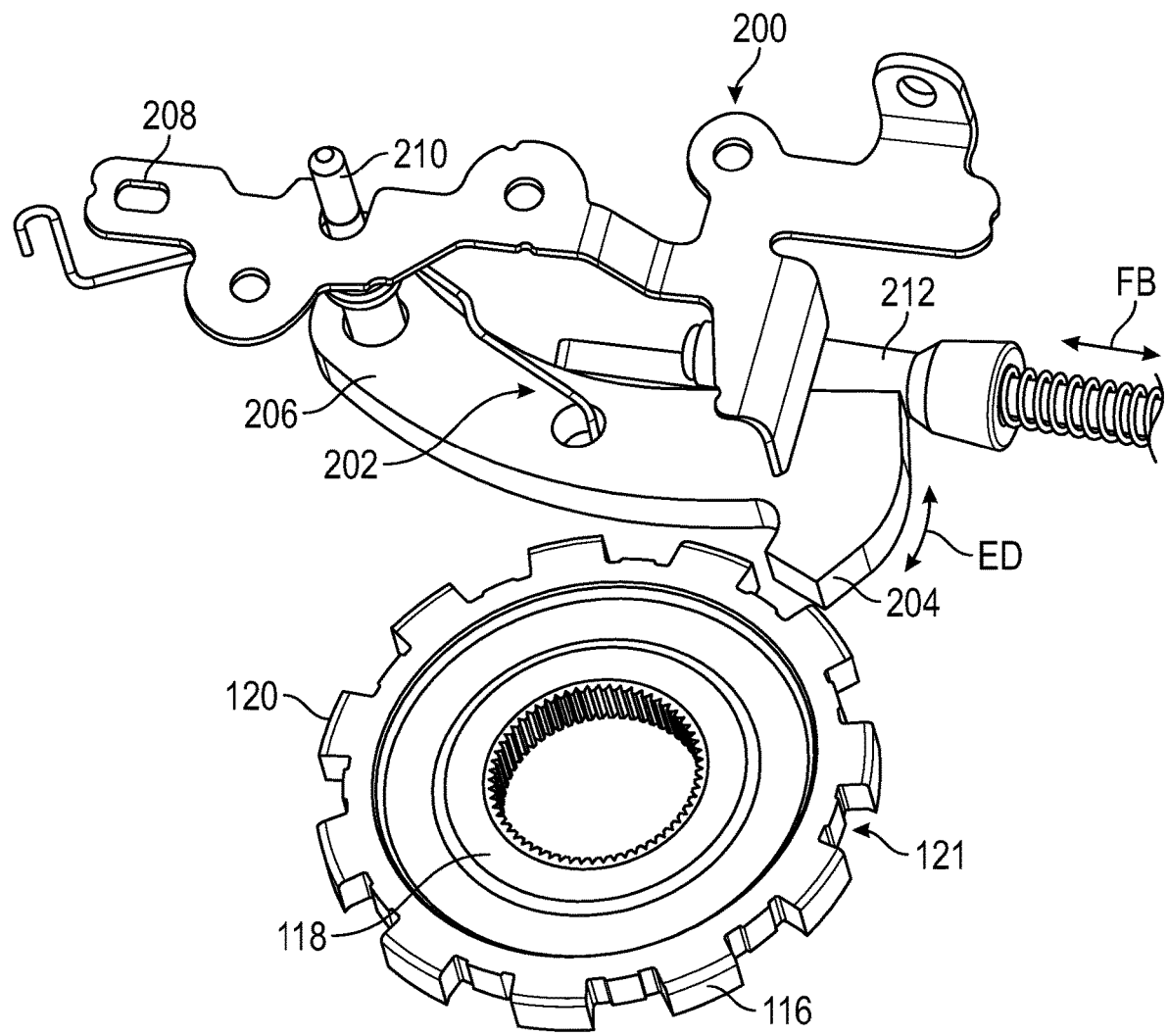
FIG. 3 is a schematic, perspective view of a park system for the drive unit of FIG. 1.

As described below, the drive unit 100 includes a single park system 200 configured to lock the differential 114 in place to preclude movement of both the first machine shaft 106 and the second machine shaft 108 of the first electric machine 102 and the second electric machine 104, respectively. In other words, the drive unit 100 does not include other park systems aside the from the park system 200. By including the single park system 200, manufacturing of the drive unit 100 is simplified. The differential 114 includes a park gear 116, and the park system 200 is configured to engage the park gear 116 to simultaneously stop and prevent rotation of the first machine shaft 106 and the second machine shaft 108 of the first electric machine 102 and the second electric machine 104, respectively. As discussed below, the park system 200 includes a single pawl 202 movable relative to the park gear 116 between an engaged position (as shown in FIG. 2) and a disengaged position (as shown in FIG. 3). When the single pawl 202 is in the disengaged position, the pawl 202 is spaced apart and does not necessarily contact the park gear 116 of the differential 114, thereby allowing the park gear 116 to rotate. As a consequence, the first machine shaft 106 and the second machine shaft 108 of the first electric machine 102 and the second electric machine 104, respectively, are able to rotate freely when the pawl 202 is in the disengaged position. When the pawl 202 is in the engaged position, the pawl 202 is in direct contact with the park gear 116 of the differential 114, thereby precluding the park gear 116 from rotating. As a consequence, the first machine shaft 106 and the second machine shaft 108 of the first electric machine 102 and the second electric machine 104, respectively, are unable to rotate when the pawl 202 is in the engaged position.

With reference to FIG. 3, the park system 200 includes the pawl 202, which is configured to engage the park gear 116. The park gear 116 may be configured as a spur gear and includes a main gear body 118 and a plurality of teeth 120 extending from the main gear body 118. The park gear 116 defines a spacing 122 between two teeth 120. Each spacing 122 of the park gear 116 is sized to receive a pawl tooth 204 of the pawl 202. The pawl 202 includes a pawl body 206. The pawl tooth 204 protrudes directly from the pawl body 206 and is sized to be received by each spacing 122 of the park gear 116. When the pawl 202 is in the engaged position, the pawl tooth 204 is disposed inside one of the spacings 122 to the park gear 116 to prevent the park gear 116 from rotating. When the park gear 116 does not rotate, the first machine shaft 106 and the second machine shaft 108 of the first electric machine 102 and the second electric machine 104, respectively, are also unable to rotate.

The park system 200 includes a fixed support 208, which may be configured as a metallic frame, and a pivot pin 210 interconnecting the pawl 202 and the fixed support 208. The pawl 202 is therefore pivotable relative to the fixed support 208 about the pivot pin 210 in the direction indicated by double arrow ED. The park system 200 further includes an actuation shaft 212 coupled to the pawl 202 and movable relative to the pawl 202 in the direction indicated by double arrows FB to move the pawl tooth 204 toward and away from the park gear 116. The park system 200 may include a biasing member 214, such as a coil spring, to bias the actuation shaft 212 in a forward direction toward the pivot pin 210.

Returning to FIG. 2, the drive unit 100 includes a first machine gear 124 coupled around the first machine shaft 106 and a second machine gear 126 coupled around the second machine shaft 108. Accordingly, the first machine gear 124 rotates in unison with the first machine shaft 106, and the second machine gear 126 rotates in unison with the second machine shaft 108.

The drive unit 100 further includes a first transfer shaft 128 and a second transfer shaft 130, which are rotatable independently of each other. The first transfer shaft 128 extends along a first transfer axis T1, and the second transfer shaft 130 extends along the second transfer axis T2. The first transfer axis T1 and the second transfer axis T2 are coaxial to facilitate manufacturing. Each of the first machine axis M1 and the second machine axis M2 is parallel to each of the first transfer axis T1 and the second transfer axis T2 to facilitate manufacturing. The drive unit 100 further includes first shaft gear 132 coupled around the first transfer shaft 128 and a second shaft gear 134 coupled around the second transfer shaft 130. Thus, the first shaft gear 132 rotates in unison with the first transfer shaft 128, and the second shaft gear 134 rotates in unison with the second transfer shaft 130. The first shaft gear 132 is meshed with the first machine gear 124. Accordingly, torque is transferred from the first electric machine 102 to the first transfer shaft 128. The second shaft gear 134 is meshed with the second machine gear 126. Accordingly, torque is transferred from the second electric machine 104 to the second transfer shaft 130. The first transfer shaft 128 includes a first inner gear 136, and the second transfer shaft 130 includes a second inner gear 138.

The drive unit 100 further includes a first output shaft 140 and a second output shaft 142 each of which delivers torque to the wheels 14 (FIG. 1). The first output shaft 140 extends along a first output axis OS1, and the second output shaft 142 extends along a second output axis OS2. In the depicted embodiment, each of the first output axis OS1 and the second output axis OS2 is parallel to the first transfer axis T1 and the second transfer axis T2 to facilitate manufacturing. In the depicted embodiment, the first output axis OS1 and the second output axis OS2 are coaxial to minimize the space occupied by the drive unit 100. The first output shaft 140 includes a first output gear 144, and the second output shaft 142 includes a second output gear 146. The first output gear 144 is meshed with the first inner gear 136. As such, torque is transferred from the first transfer shaft 128 to the first output shaft 140. The torque is then transferred from the first output shaft to one of the wheels 14 (FIG. 1). The second output gear 146 is meshed with the second inner gear 138. As such, torque is transferred from the second transfer shaft 130 to the second output shaft 142. The torque is then transferred from the second output shaft 142 to one of the wheels 14 (FIG. 1). The first output shaft 140 and the second output shaft 142 rotate independently from each other.

Figure 4:
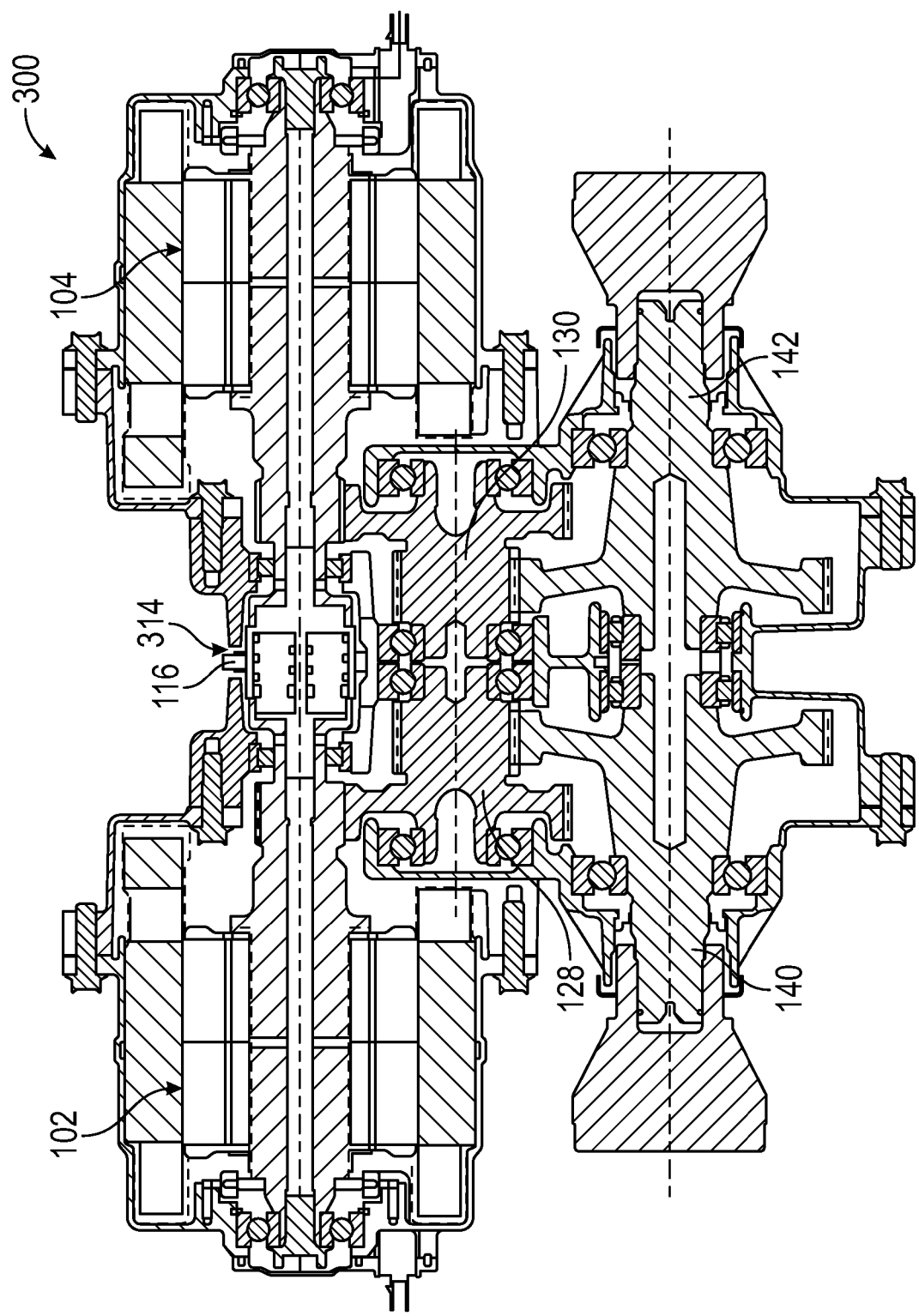
FIG. 4 is a schematic, sectional side view of the drive unit in accordance with an aspect of the present disclosure, wherein the drive unit includes a torque biasing differential.

FIG. 4 shows a drive unit 300 in accordance with another aspect of the present disclosure. The structure and function of the drive unit 300 is substantially identical to the structure and function of the drive unit 100 described above, except for the features described below. The drive unit 300 includes a torque biasing differential 314 coupled between the first electric machine 102 and the second electric machine 104. The biasing differential 314 also includes a park gear 116 configured to engage the single pawl 202 (FIGS. 2 and 3). When the torque biasing differential 314 is used, a certain amount of torque can be biased to the wheel 14 (FIG. 1) that has better traction from the wheel 14 that slips.

Figure 5:
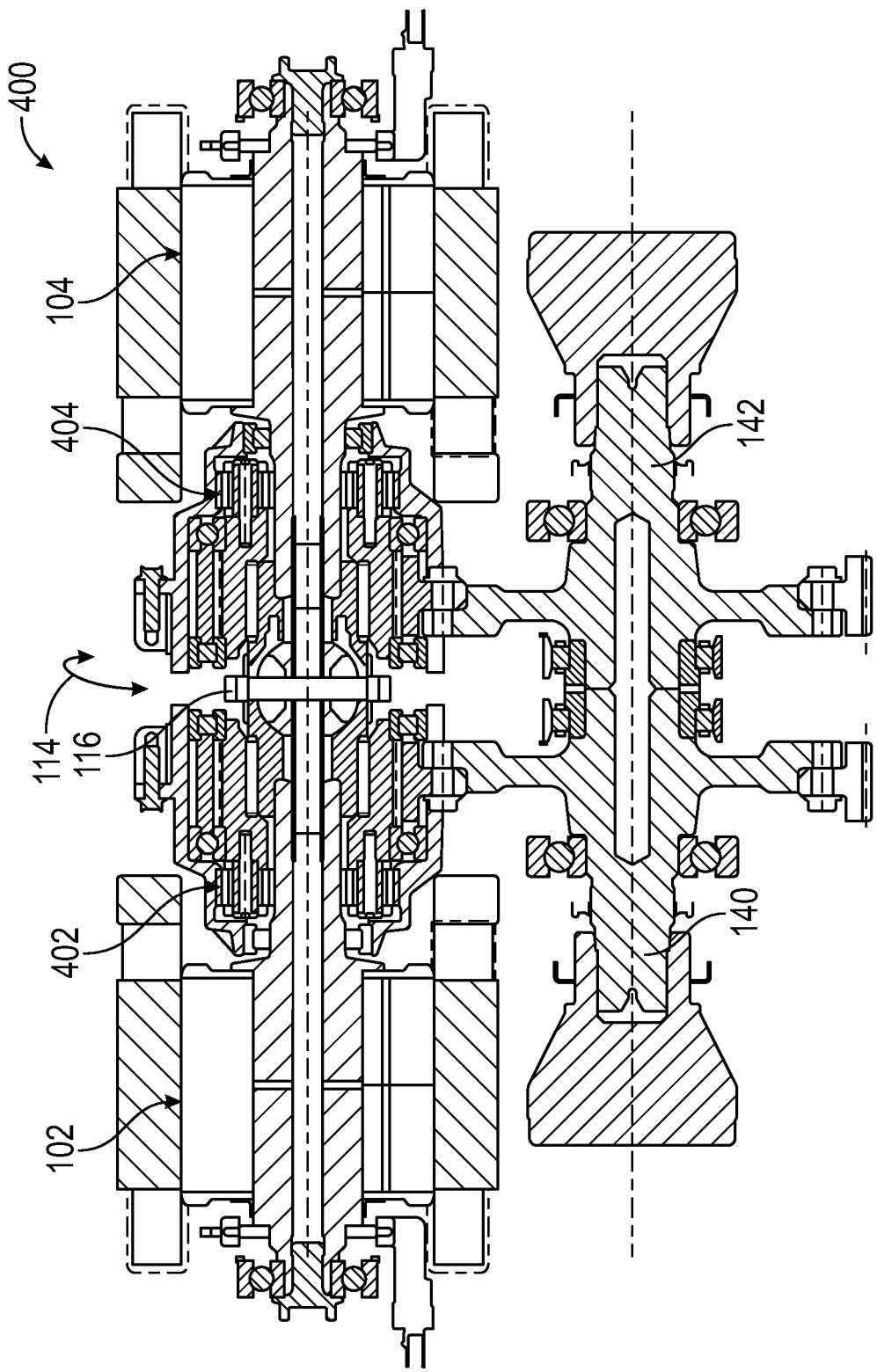
FIG. 5 is a schematic, sectional side view of the drive unit in accordance with an aspect of the present disclosure, wherein the drive unit includes electric machines, a differential, and planetary gearsets proximate to the differential to reduce the output speed of the electric machines.

FIG. 5 shows a drive unit 400 in accordance with another aspect of the present disclosure. The structure and function of the drive unit 400 is substantially identical to the structure and function of the drive unit 100 described above, except for the features described below. The drive unit 400 includes a first planetary gearset 402 coupled to the first electric machine 102 and a second planetary gearset 404 coupled to the second electric machine 104. The first planetary gearset 402 serves as a first stage reduction gearing to reduce the output speed of the first electric machine 102, and the second planetary gearset 404 serves as a first stage reduction gearing to reduce the output speed of the second electric machine 104. The drive unit 400 does not include the first transfer shaft 128 (FIG. 2) and the second transfer shaft 130 (FIG. 2). Rather, torque is transferred from the first electric machine 102 to the first output shaft 140 through the first planetary gearset 402, and torque is transferred second electric machine 104 to the second output shaft 142 through the second planetary gearset 404. The differential 114 includes the park gear 116 configured to engage the pawl 202 (FIGS. 2 and 3). This configuration is more compact than the other configurations shown in FIGS. 2, 4, and 5.

Figure 6:
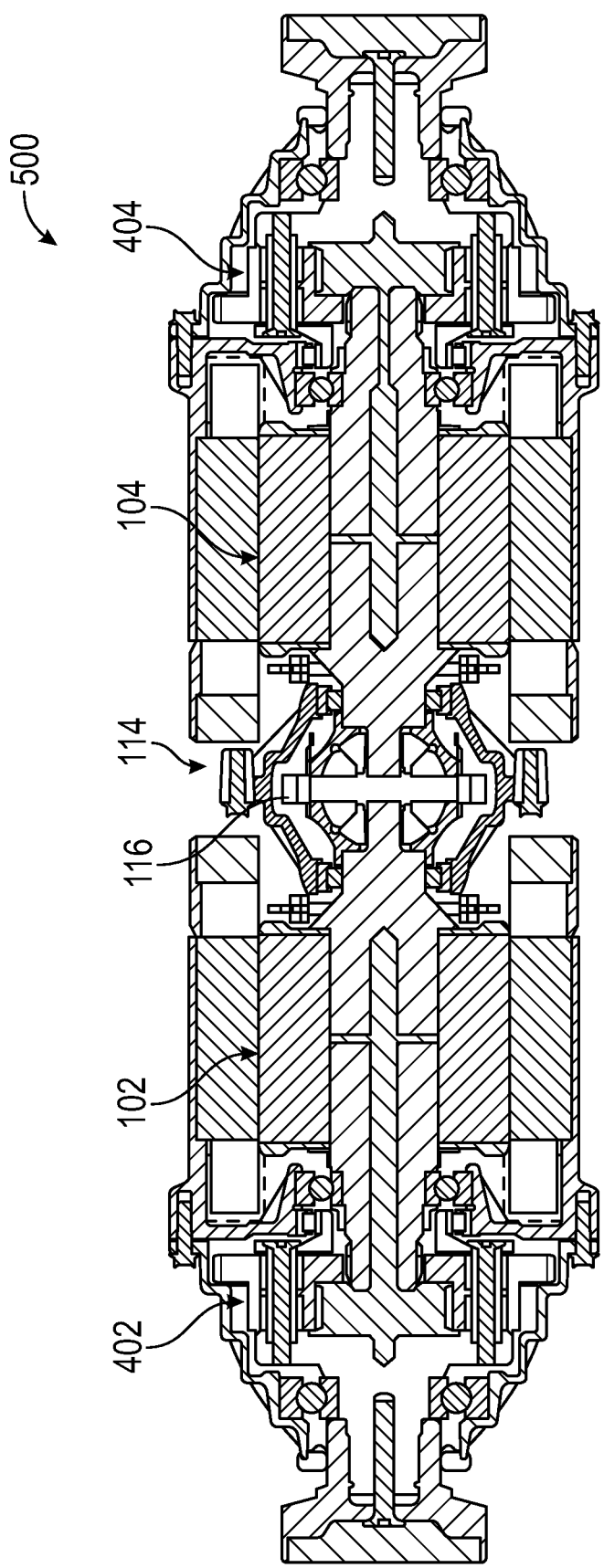
FIG. 6 is a schematic, sectional view of the drive unit in accordance with an aspect of the present disclosure, wherein the drive unit includes electric machines, a differential, and planetary gearsets spaced apart from the differential to reduce the output speed of the electric machines.

FIG. 6 shows a drive unit 500 in accordance with another aspect of the present disclosure. The structure and function of the drive unit 500 is substantially identical to the structure and function of the drive unit 100 described above, except for the features described below. In this embodiment, solely the first planetary gearset 402 and the second planetary gearset 404 are used for reducing the output speed of the first electric machine 102 and the second electric machine 104, respectively. The drive unit 500 does not include the first transfer shaft 128 (FIG. 2), the second transfer shaft 130 (FIG. 2), the first output shaft 140 (FIG. 2), and second output shaft 142 (FIG. 2). The differential 114 includes the park gear 116 configured to engage the pawl 202 (FIGS. 2 and 3).

Figure 7:
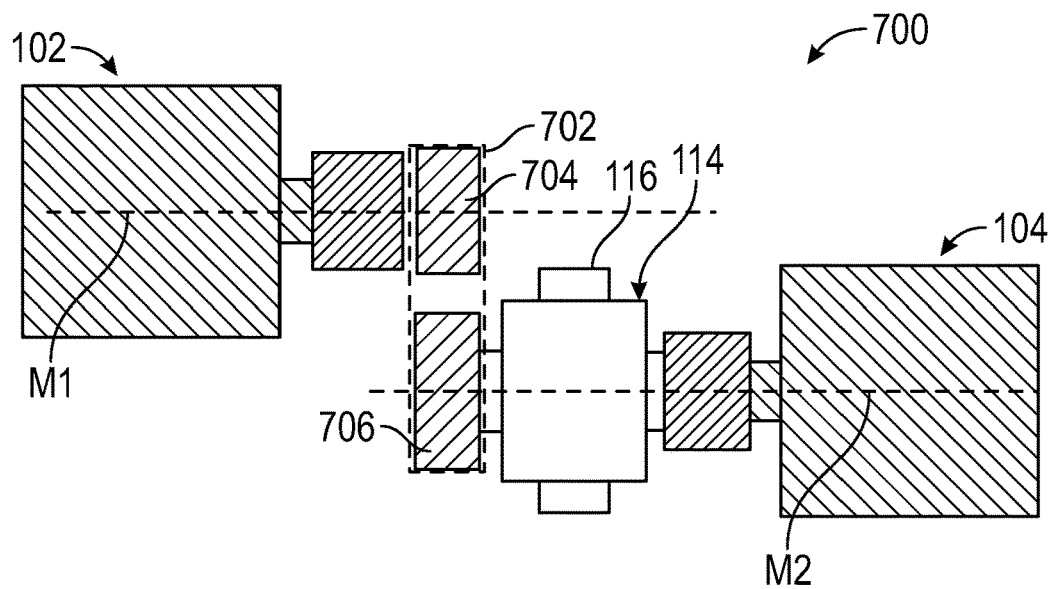
FIG. 7 is a schematic, side view of the drive unit in accordance with an aspect of the present disclosure, wherein the drive unit includes electric machines, a differential, and chain coupled between the electric machines.

FIG. 7 shows a drive unit 700 in accordance with another aspect of the present disclosure. The structure and function of the drive unit 700 is substantially identical to the structure and function of the drive unit 100 described above, except for the features described below. In the depicted embodiment, the first machine axis M1 of the first electric machine 102 is not coaxial with the second machine axis M2 of the second electric machine 104. However, the second machine axis M2 is parallel to the first machine axis M1. The drive unit 700 includes a chain 702 interconnects the first electric machine 102 and the second electric machine 104 through the differential 114. The drive unit 700 may include a first sprocket 704 coupled to the chain 702 and the first electric machine 102 and a second sprocket 706 coupled to the chain 702 and the differential 114. The first sprocket 704 rotates about the first machine axis M1, and the second sprocket 706 rotates about the second machine axis M2. The differential 114 includes the park gear 116 configured to engage the pawl 202 (FIGS. 2 and 3).

Figure 8:
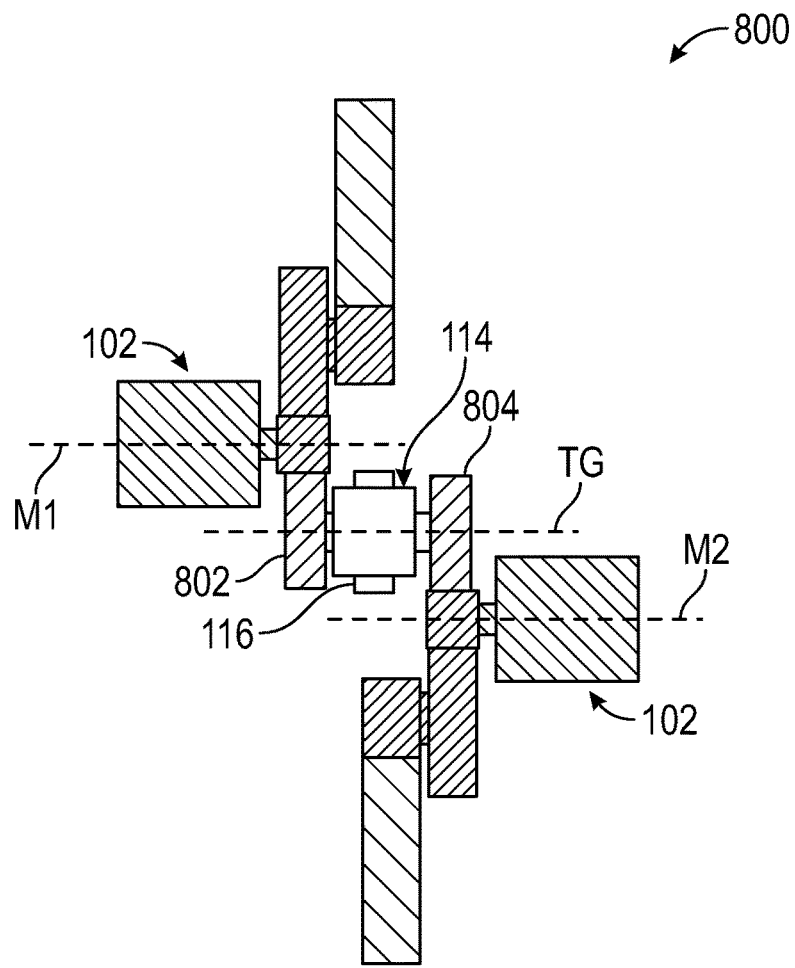
FIG. 8 is a schematic, side view of the drive unit in accordance with an aspect of the present disclosure, wherein the drive unit includes electric machines, a differential, and transfer gears coupled between the electric machines.

FIG. 8 shows a drive unit 800 in accordance with another aspect of the present disclosure. The structure and function of the drive unit 800 is substantially identical to the structure and function of the drive unit 100 described above, except for the features described below. In the depicted embodiment, the drive unit 100 includes a first transfer gear 802 and a second transfer gear 804. The first transfer gear 802 connects the differential 114 to the first electric machine 102. The second transfer gear 804 connects the differential 114 to the second electric machine 104 and the first machine shaft and the second machine shaft are not coaxial. Each of the first transfer gear 802 and the second transfer gear 804 rotates about a transfer gear axis TG, which is parallel to the first machine axis M1 and the second machine axis M2. The first machine axis M1 and the second machine axis M2 are not coaxial. The first machine axis M1 is parallel to the second machine axis M2. The differential 114 includes the park gear 116 configured to engage the pawl 202 (FIGS. 2 and 3).

The detailed description and the drawings or figures are a supportive description of the present teachings, but the scope of the present teachings is defined solely by the claims. While some of the best modes and other embodiments for carrying out the present teachings have been described in detail, various alternative designs and embodiments exist for practicing the present teachings defined in the appended claims.

What is claimed is:

1. A drive unit, comprising:
   a first electric machine including a first machine shaft;
   a second electric machine including a second machine shaft;
   a differential interconnecting the first electric machine and the second electric machine, wherein the differential includes a park gear;
   a park system configured to engage the park gear of the differential to simultaneously stop rotation of both the first electric machine and the second electric machine;
   wherein the park system includes a pawl movable relative to the park gear between an engaged position and a disengaged position;
   wherein the pawl is spaced apart from the park gear of the differential in the disengaged position to allow the park gear to rotate;
   wherein the pawl is in contact with the park gear of the differential in the engaged position to preclude rotation of the park gear, thereby precluding rotation of the first machine shaft of the first electric machine and the second machine shaft of the second electric machine; and
   wherein the first machine shaft and the second machine shaft are not coaxial, and the drive unit further includes a chain connecting the first machine shaft and the second machine shaft through the differential.

2. The drive unit of claim 1, wherein the park system is a single park system, the pawl is a single pawl, the first machine shaft of the first electric machine is directly coupled to the differential, the second machine shaft of the second electric machine is directly coupled to the differential, the single pawl is in direct contact with the park gear of the differential when the single pawl is in the engaged position, and the differential is open differential.

3. The drive unit of claim 2, wherein each of the first machine shaft and the second machine shaft are rotatable independently from each other, and the drive unit further includes a first machine gear coupled around the first machine shaft and a second machine gear coupled around the second machine shaft.

4. The drive unit of claim 3, further comprising a first transfer shaft coupled to the first machine shaft such that torque is transferred from the first electric machine to the first transfer shaft, the drive unit further comprises a second transfer shaft coupled to the second machine shaft such that torque is transferred from the second electric machine to the second transfer shaft, the first transfer shaft and the second transfer shaft are independently rotatable relative to each other, the first transfer shaft and the second transfer shaft are coaxial with each other, the first machine shaft extends along a first machine axis, the second machine shaft extends along a second machine axis, the first machine axis is coaxial with the second machine axis, the first transfer shaft extends along a first transfer axis, the second transfer shaft extends along a second transfer axis, the first transfer axis is coaxial with the second transfer axis, and the first machine axis is parallel to the first transfer axis.

5. The drive unit of claim 4, further comprising a first shaft gear coupled around the first shaft gear, the first shaft gear is meshed with the first machine gear such that torque is transferred from the first electric machine to the first transfer shaft, the drive unit includes a second shaft gear coupled around the second shaft gear, the second shaft gear is meshed with the second machine gear such that torque is transferred from the second electric machine and the second shaft gear.

6. The drive unit of claim 5, wherein the first transfer shaft includes a first inner gear, the second transfer shaft includes a second inner gear, the drive unit further includes a first output shaft and a second output shaft, the first output shaft and the second output shaft are coaxial with each other, the first output shaft includes a first output gear meshed with the first inner gear such that torque is transferred from the first transfer shaft to the first output shaft, the second output shaft includes a second output gear meshed with the second inner gear such that torque is transferred from the second transfer shaft to the second output shaft, and the first output shaft and the second output shaft are rotatably independent from each other.

7. The drive unit of claim 1, wherein the differential is a torque biasing differential.

8. The drive unit of claim 1, further comprising at least one planetary gearset coupled to at least one of the first electric machine or the second electric machine.

9. The drive unit of claim 1, further comprising a first transfer gear and a second transfer gear, wherein the first transfer gear connects the differential to the first electric machine.

10. A vehicle system, comprising:
a vehicle body;
a drive unit disposed inside the vehicle body, wherein the drive unit includes:
  a first electric machine including a first machine shaft;
  a second electric machine including a second machine shaft;
  a differential interconnecting the first electric machine and the second electric machine, wherein the differential includes a park gear;
  a park system configured to engage the park gear of the differential to simultaneously stop rotation of both the first electric machine and the second electric machine;
  wherein the park system includes a pawl movable relative to the park gear between an engaged position and a disengaged position;
  wherein the pawl is spaced apart from the park gear of the differential in the disengaged position to allow the park gear to rotate;
  wherein the pawl is in contact with the park gear of the differential in the engaged position to preclude rotation of the park gear, thereby precluding rotation of the first machine shaft of the first electric machine and the second machine shaft of the second electric machine; and
  wherein the first machine shaft and the second machine shaft are not coaxial, and the drive unit further includes a chain connecting the first machine shaft and the second machine shaft through the differential.

11. The vehicle system of claim 10, wherein the park system is a single park system, the pawl is a single pawl, the first machine shaft of the first electric machine is directly coupled to the differential, the second machine shaft of the second electric machine is directly coupled to the differential, the single pawl is in direct contact with the park gear of the differential when the single pawl is in the engaged position, and the differential is open differential.

12. The vehicle system of claim 11, wherein each of the first machine shaft and the second machine shaft are rotatable independently from each other, and the drive unit further includes a first machine gear coupled around the first machine shaft and a second machine gear coupled around the second machine shaft.

13. The vehicle system of claim 12, further comprising a first transfer shaft coupled to the first machine shaft such that torque is transferred from the first electric machine to the first transfer shaft, the drive unit further comprises a second transfer shaft coupled to the second machine shaft such that torque is transferred from the second electric machine to the second transfer shaft, the first transfer shaft and the second transfer shaft are independently rotatable relative to each other, the first transfer shaft and the second transfer shaft are coaxial with each other, the first machine shaft extends along a first machine axis, the second machine shaft extends along a second machine axis, the first machine axis is coaxial with the second machine axis, the first transfer shaft extends along a first transfer axis, the second transfer shaft extends along a second transfer axis, the first transfer axis is coaxial with the second transfer axis, and the first machine axis is parallel to the first transfer axis.

14. The vehicle system of claim 13, further comprising a first shaft gear coupled around the first shaft gear, the first shaft gear is meshed with the first machine gear such that torque is transferred from the first electric machine to the first transfer shaft, the drive unit includes a second shaft gear coupled around the second shaft gear, the second shaft gear is meshed with the second machine gear such that torque is transferred from the second electric machine and the second shaft gear.

15. The vehicle system of claim 14, wherein the first transfer shaft includes a first inner gear, the second transfer shaft includes a second inner gear, the drive unit further includes a first output shaft and a second output shaft, the first output shaft and the second output shaft are coaxial with each other, the first output shaft includes a first output gear meshed with the first inner gear such that torque is transferred from the first transfer shaft to the first output shaft, the second output shaft includes a second output gear meshed with the second inner gear such that torque is transferred from the second transfer shaft to the second output shaft, and the first output shaft and the second output shaft are rotatably independent from each other.

16. The vehicle system of claim 10, wherein the differential is a torque biasing differential.

17. The vehicle system of claim 10, further comprising at least one planetary gearset coupled to at least one of the first electric machine or the second electric machine.

18. The vehicle system of claim 10, further comprising a first transfer gear and a second transfer gear, wherein the first transfer gear connects the differential to the first electric machine, the second transfer gear connects the differential to the second electric machine.

* * * * *